(12) United States Patent
Bortz et al.

(10) Patent No.: US 8,218,265 B2
(45) Date of Patent: Jul. 10, 2012

(54) APPARATUS, SYSTEM, AND METHOD FOR OVERCOMING STICTION IN A MAGNETIC TAPE DEVICE

(75) Inventors: Kent P. Bortz, Tucson, AZ (US); Oscar Pulgarin, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 12/192,095

(22) Filed: Aug. 14, 2008

(65) Prior Publication Data

US 2010/0039731 A1 Feb. 18, 2010

(51) Int. Cl.
*G11B 15/60* (2006.01)
(52) U.S. Cl. .................................. 360/130.21
(58) Field of Classification Search .............. 360/85, 360/128, 130.2, 130.21
See application file for complete search history.

(56) References Cited

U.S. PATENT DOCUMENTS

| | | | |
|---|---|---|---|
| 4,656,534 A | 4/1987 | Emmerich et al. | |
| 5,023,737 A * | 6/1991 | Yaeger | 360/254.5 |
| 5,060,099 A * | 10/1991 | Yaeger et al. | 360/254.5 |
| 5,367,471 A | 11/1994 | Nguyen et al. | |
| 5,460,334 A | 10/1995 | Joung | |
| 5,463,514 A * | 10/1995 | Yaeger | 360/254.3 |
| 5,504,635 A | 4/1996 | Lee | |
| 5,543,980 A | 8/1996 | Fukuzawa | |
| 5,758,837 A | 6/1998 | Doninelli | |
| 5,775,616 A | 7/1998 | Sim et al. | |
| 6,707,646 B2 | 3/2004 | Berger et al. | |
| 6,759,816 B2 | 7/2004 | Eaton | |
| 6,764,166 B2 | 7/2004 | Silberbrook | |
| 6,954,339 B2 * | 10/2005 | Bement et al. | 360/294.7 |
| 7,334,750 B2 | 2/2008 | Vanderheyden et al. | |
| 7,542,237 B2 * | 6/2009 | Ma et al. | 360/235.1 |

OTHER PUBLICATIONS

Stiction and Hard Disk Drives, Wikipedia the free encyclopedia, http://en.wikipedia.org/wiki/Stiction May 9, 2008.
Mechanism for Eliminating Head-Tape Stiction in Magnetic Tape Drives, IBM Technical Disclosure Bulletin, Nov. 1990, http://www.priorartdatabase.com/IPCOM/000102273/.

\* cited by examiner

*Primary Examiner* — Angel A. Castro
(74) *Attorney, Agent, or Firm* — Kunzler Needham Massey & Thorpe (57) ABSTRACT

Various embodiments of an apparatus, system, and method are disclosed for reducing stiction in a magnetic tape device. For example, according to one representative embodiment, a magnetic head assembly for reducing stiction includes a magnetic head that is communicable in data exchange communication with tape in contact with the magnetic head. The magnetic head assembly also includes a tape lifter that is movable relative to the magnetic head. More specifically, the tape lifter is movable between a first position away from the tape and a second position in contact with the tape. In the first position, tape is contactable with the magnetic head and in the second position, tape is not contactable with the magnetic head. The magnetic head assembly further includes an actuator made at least partially of a memory shape alloy. The actuator is coupled to the tape lifter and the memory shape alloy is resiliently deformable to move the tape lifter between the first and second positions.

20 Claims, 5 Drawing Sheets

APPARATUS, SYSTEM, AND METHOD FOR OVERCOMING STICTION IN A MAGNETIC TAPE DEVICE

FIELD

This disclosure relates to magnetic tape reading and writing devices, such as tape drives, and more particularly to apparatus, systems and methods for overcoming stiction in magnetic tape reading and writing devices.

BACKGROUND

Magnetic tape reading and writing devices, such as tape drives and cassette tape players and recorders, include a magnetic head in contact with tape from a tape supply reel in a tape cassette or cartridge. The tape is fed from the tape supply reel along the magnetic head, which applies a magnetic flux to a layer of oxide to record data and facilitates a varying magnetic field across a gap in the head to playback or receive data from tape with information recorded thereon. Magnetic heads are designed to record and read data only when the tape is moving across the head.

Magnetic tape devices can suffer from a condition known as "stiction" (i.e., static friction), which is used herein to describe a buildup of static friction between the tape and the magnetic head, or other magnetic tape device components, such as tape cleaners. When stiction occurs, the tape is effectively stuck to the magnetic head. Generally, stiction only occurs when motion of the tape is stopped or moving at an extremely slow rate of speed, such as when the magnetic tape device is not in use or the device is between read and write operations. When the tape is in motion, such as during read and write operations, stiction typically does not occur. Without tape motion, the surface tension of any condensed water between the tape and head often induces stiction. Therefore, the occurrence of stiction is commonly dependent upon the temperature, humidity, and surface characteristics of the tape and head. Moreover, because recent developments have introduced tape and magnetic heads made with smoother and higher capacity elements, stiction in magnetic tape devices, particularly tape drives, has become a growing problem.

Several attempts have been made at overcoming the problem of stiction in magnetic tape devices, each with limited success. For example, attempts have been made to modify the surface characteristics of the magnetic head, which can be very expensive to implement. Other attempts include moving the tape in multiple directions to "unstick" the tape and moving the head up and down relative to the tape. The success of these attempts has been limited because each involves application of a force perpendicular to the static friction force, which may increase the likelihood of tearing or damaging the tape.

An additional attempt includes moving portions of the roller assembly (e.g., the inter-tape guidance rollers) away from the magnetic head to physically move the tape out of contact with the head. Such a movable tape roller assembly can be complex, difficult to manufacture, and costly to implement.

A further attempt includes an anti-stiction device designed to prevent stiction from occurring rather than "unsticking" tape after stiction has occurred. The anti-stiction device includes an anti-adhesion unit with a complex configuration of levers, axles, and actuators (e.g., solenoid or motor) that move a slanted displacement lever to displace the tape if stiction is likely to occur. The anti-stiction device is designed to move the tape out of contact with a tape cleaner and only partially out of contact with a magnetic head if an algorithm indicates the speed of the tape is below a minimum tape speed greater than zero. Such an anti-stiction device is quite complex, is expensive to manufacture due to the large amount of material and components used, and requires an inconvenient amount of overhead and controls to operate.

Based on the above, a magnetic tape device configured to reduce, and even eliminate, stiction between the magnetic head and the tape while overcoming one or more of the shortcomings of conventional magnetic tape devices would be desirable.

SUMMARY

The subject matter of the present application has been developed in response to the present state of the art, and in particular, in response to the problems and needs in the art concerning stiction that have not yet been fully solved by currently available magnetic tape devices. Accordingly, the subject matter of the present application has been developed to provide a simple and cost-effective magnetic tape device, and associated methods, that eliminates head-to-tape stiction and overcomes at least some shortcomings of the prior art magnetic tape devices.

For example, according to one representative embodiment, a magnetic head assembly for reducing stiction includes a magnetic head that is communicable in data exchange communication with tape in contact with the magnetic head. The magnetic head assembly also includes a tape lifter that is movable relative to the magnetic head. More specifically, the tape lifter is movable between a first position away from the tape and a second position in contact with the tape. In the first position, tape is contactable with the magnetic head and in the second position, tape is not contactable with the magnetic head. The magnetic head assembly further includes an actuator made at least partially of a memory shape alloy. The actuator is coupled to the tape lifter and the memory shape alloy is resiliently deformable to move the tape lifter between the first and second positions.

In some implementations, as the tape lifter moves from the first position to the second position, the tape lifter lifts tape in contact with the magnetic head out-of-contact with the magnetic head. The tape can be lifted in a direction perpendicular to a major surface of the tape.

According to some implementations, the actuator is coupled to an electrical power source. In these implementations, the memory shape alloy is resiliently deformable to move the tape lifter from the first position to the second position by applying an electric current to the actuator from the electrical power source. In some instances, the actuator is selectively controllable to move the tape lifter from the first position to the second position when the tape is stationary relative to the magnetic head and stiction is detected between the tape and magnetic head.

In certain implementations, the magnetic head assembly includes a biasing member coupled to the tape lifter and configured to bias the tape lifter in the first position.

According to further implementations of the magnetic head assembly, the tape lifter includes a lever having a tape engager portion. In some instances, the tape engager portion can include a tape contact surface substantially parallel to a major surface of the tape prior to and during contact with the tape. In yet further instances, the lever and tape engager portion linearly move in a direction perpendicular to a plane of the tape as the tape lifter is actuated between the first and second positions. When the tape lifter is in the first position, the actuator can be substantially curved, and when the tape lifter is in the second position, the actuator can be substantially straight.

According to yet another embodiment, a method for reducing stiction between a magnetic head of a magnetic tape device and tape in contact with the magnetic head includes determining whether stiction is occurring between the magnetic head and stationary tape in contact with the head. If stiction is occurring between the magnetic head and stationary tape in contact with the head, the method includes reversibly deforming an actuator from a first shape to a second shape. The method further includes moving a lever from a retracted position corresponding to the first shape of the actuator to a deployed position corresponding to the second shape of the actuator. The first shape can be a substantially curved shape and the second shape can be a substantially straight shape. Additionally, the method includes lifting the stationary tape in contact with the magnetic head away from the magnetic head with the lever as the lever moves from the retracted position to the deployed position.

In some implementations of the method, the actuator is made from a memory shape alloy and reversibly deforming the actuator comprises applying an electric current to the actuator. In yet some implementations, moving the lever from the retracted position to the deployed position includes moving the lever along a substantially straight path in a direction substantially perpendicular to a plane of the tape.

The method can also include lowering the stationary tape back into contact with the magnetic head by removing the electric current from the actuator if operation of the magnetic head is requested.

In another representative embodiment, a magnetic tape device includes a tape take-up reel communicable in tape receiving communication with a tape supply reel. The device also includes a magnetic head assembly intermediate the tape take-up reel and supply reel. The magnetic head assembly includes a magnetic head contactable with tape extending between the tape take-up reel and supply reel and a deployable lever coupled to a resiliently deformable actuator. The magnetic tape device further includes a controller operable to request application of an electric current to the actuator to deform the actuator. Deformation of the actuator deploys the lever into contact with tape extending between the tape take-up reel and supply reel to lift tape in contact with the magnetic head away from the magnetic head.

In some implementations, the controller requests application of an electric current to the actuator when tape extending between the tape take-up reel and supply reel is stationary relative to the magnetic head and stiction is occurring between the tape and the magnetic head.

The actuator of the magnetic tape device can include an elongate member made from a memory shape alloy. The memory shape alloy can be a nickel-titanium alloy. Moreover, the elongate member can be curved before deformation and straight after deformation. In specific implementations, the elongate member includes a first end fixed relative to the magnetic head and a second end movable relative to the magnetic head. The second end can be attached to the lever such that as the elongate member deforms, the free end moves about the fixed end to deploy the lever.

In some implementations, the controller is operable to remove the electric current from the actuator to allow the actuator to return to an undeformed state and retract the lever out of contact with tape extending between the tape take-up reel and supply reel to lower the tape back into contact with the magnetic head.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the subject matter described herein may be combined in any suitable manner in one or more embodiments. In the following description, numerous specific details are provided, such as examples of controls, structures, algorithms, programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

Described herein are several embodiments of a magnetic tape device that is operable to unstick tape from a magnetic head to which the tape has been static frictionally stuck. Generally, the tape is unstuck via a tape lift mechanism that is actuated by applying an electric current to a memory shape alloy forming a part of the lift mechanism.

Figure 1:
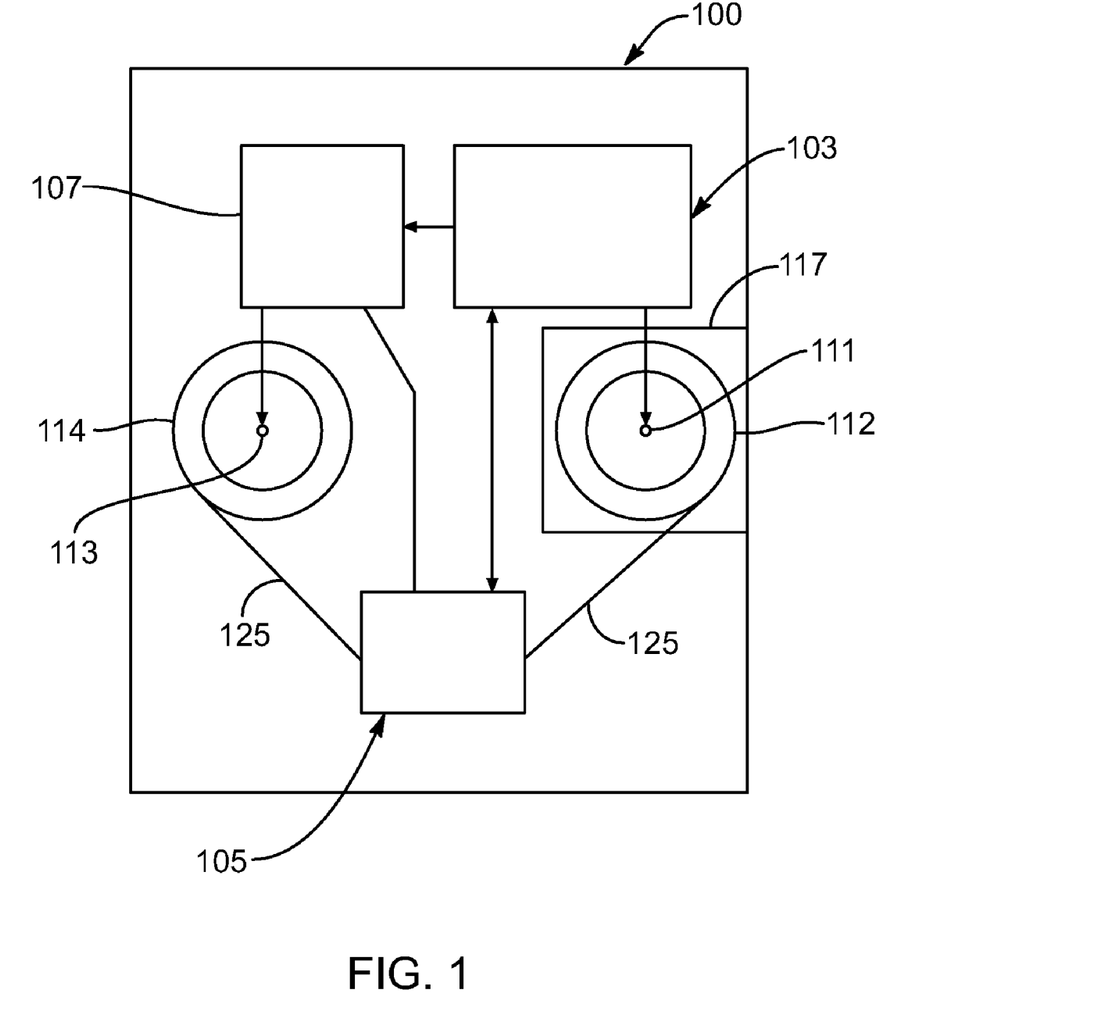
FIG. 1 is a schematic illustration of a magnetic tape device according to one representative embodiment.

FIG. 1 schematically illustrates one embodiment of a magnetic tape device 100, such as a tape drive, cassette tape player/recorder, or other similar device. The device 100 includes a controller 103 in electronic communication with a magnetic head assembly 105. In addition to the magnetic head assembly 105, the controller 103 is in electronic communication with other components of the magnetic tape device 100, such as a tape drive mechanism and power source 107. Generally, the tape drive mechanism includes a supply motor 111 that drives a tape supply reel 112 and a take-up motor 113 that drives a tape take-up reel 114. As shown, the tape supply reel 112 forms part of a tape cartridge 117 that is insertable into and removable from the magnetic tape device 100. The controller 103 is operable to control the magnetic head assembly 105 and other components of the magnetic tape device. Generally, operation of the head assembly 105 is at least partially dependent upon operation of the other components of the device 100 and vice versa. Although the controller 103 is shown within the magnetic tape device 100, in some embodiments, the controller 103 can be separate from the magnetic tape device, such as a processing device of a computer to which the tape drive is operatively linked.

Figure 2:
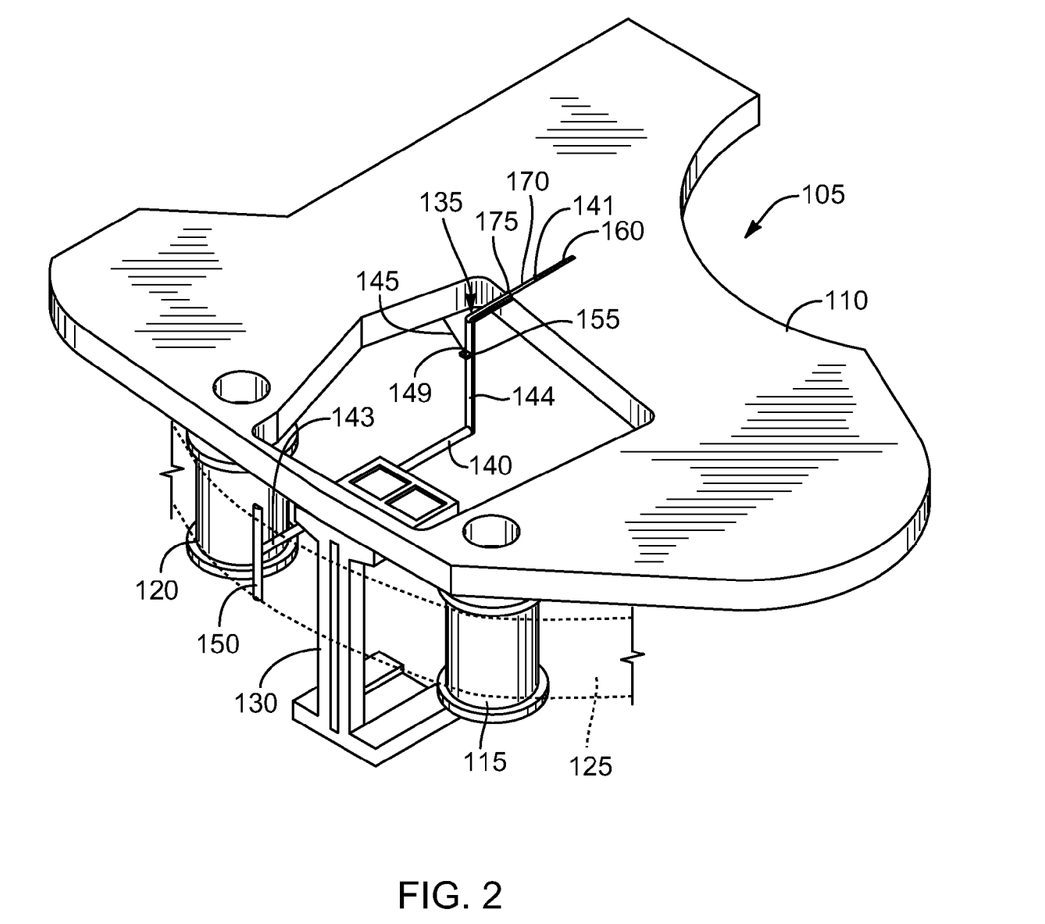
FIG. 2 is a perspective view of a magnetic head assembly according to one representative embodiment.

In one representative embodiment shown in FIG. 2, the magnetic head assembly 105 includes a base 110 and two spaced-apart tape guides 115, 120 coupled to and extending from the base. Each tape guide 115, 120 includes a cylindrically-shaped element having a generally smooth outer surface on which a length of tape 125 is guided. The tape guides 115, 120 can be stationary or rotatable relative to the tape. The magnetic head assembly 105 includes magnetic head 130 coupled to and extending away from base 110 at a location intermediate the tape guides 115, 120. As mentioned above, the magnetic tape device 100 includes a tape drive mechanism operable to move tape 125 between a supply reel 112 and a take-up reel 114. The tape guides 115, 120 are strategically positioned to guide the tape 125 past and into contact with the magnetic head 130.

In operation, as the tape 125 moves past the magnetic head 130, the magnetic head 130 is operable to record data to, erase data from, or read data from the tape. Additionally, the magnetic tape device 100 is operable to control the tape drive mechanism to move the tape 125 past the magnetic head 130 without the head performing record/erase/read operations. Regardless of the operation of the magnetic head 130, as the tape 125 moves past the head, the static friction between the tape and the head is negligible such that stiction is not a concern. However, when the tape 125 is stationary relative to the magnetic head 130, such as between magnetic head operations or when the magnetic tape device 100 is not in use, stiction between the tape and head may occur.

When stiction between the tape 125 and head 130 occurs, i.e., when the tape is effectively stuck to the head due a sufficient amount of static friction build-up between the tape and magnetic head, a tape lift mechanism 135 coupled to the base 105 is actuated to lift the stuck portion of the tape 125 away from the head. The tape lift mechanism 135 includes a lever 140 and an actuator 145. The lever 140 is movable, e.g., slidable, in a direction that is perpendicular to the plane of the tape 125. The plane of the tape 125 is defined as a plane extending through and parallel to the read/write surfaces of the tape. The lever 140 is generally cantilevered and extends from a supported end portion 141 to an unsupported or free end portion 143. The supported end portion 141 is at least partially supported by the base 105. The lever 140 includes a tape engager 150 proximate the free end portion 143. The tape engager 150 is configured to contact and move, e.g., push, the tape 125 without damaging the tape. In the illustrated embodiment, the tape engager 150 is an elongate element having a length approximately equal to or greater than a width of the tape 125 and a smooth, and in some instances, curved outer surface. In this manner, when contacting and applying a force to the tape 125, the tape engager 150 does not damage or tear the tape. Accordingly, although the illustrated tape engager 150 is shown as a rod-like, cylindrically-shaped element, in other embodiments, the tape engager 150 can be any of various elements having any of various shapes capable of contacting and pushing the tape 125 without damaging the tape.

The actuator 145 includes a length of material extending from a first fixed end 147 coupled to the base 105 to a second movable end 149 coupled to the lever 140. In the illustrated embodiment, the lever 140 includes a tab 155 for facilitating attachment of the movable end 149 of the actuator 145 to the lever 140. The actuator material can be any of various memory shape alloys, such as, for example, copper-zinc-aluminum-nickel, copper-aluminum-nickel, and nickel-titanium. In a preferred embodiment, the actuator 145 is made of nickel-titanium alloy. The unique properties of the memory shape alloys allow the actuator 145 to resiliently or reversibly deform from a first shape (see, e.g., FIG. 3) into a second shape (see, e.g., FIGS. 2 and 4) by applying an electric current to the actuator and to return back to the original shape by removing the electric current. Therefore, as shown in FIG. 1, the power source 107 is coupled to the tape lift mechanism 135 and the actuator 145 and selectively operable to control the application of an electric current to the actuator. Although the actual voltage of the electric current can vary, in certain implementations, a voltage greater than about three volts DC can be used to actuate the actuator 145.

Figure 3:
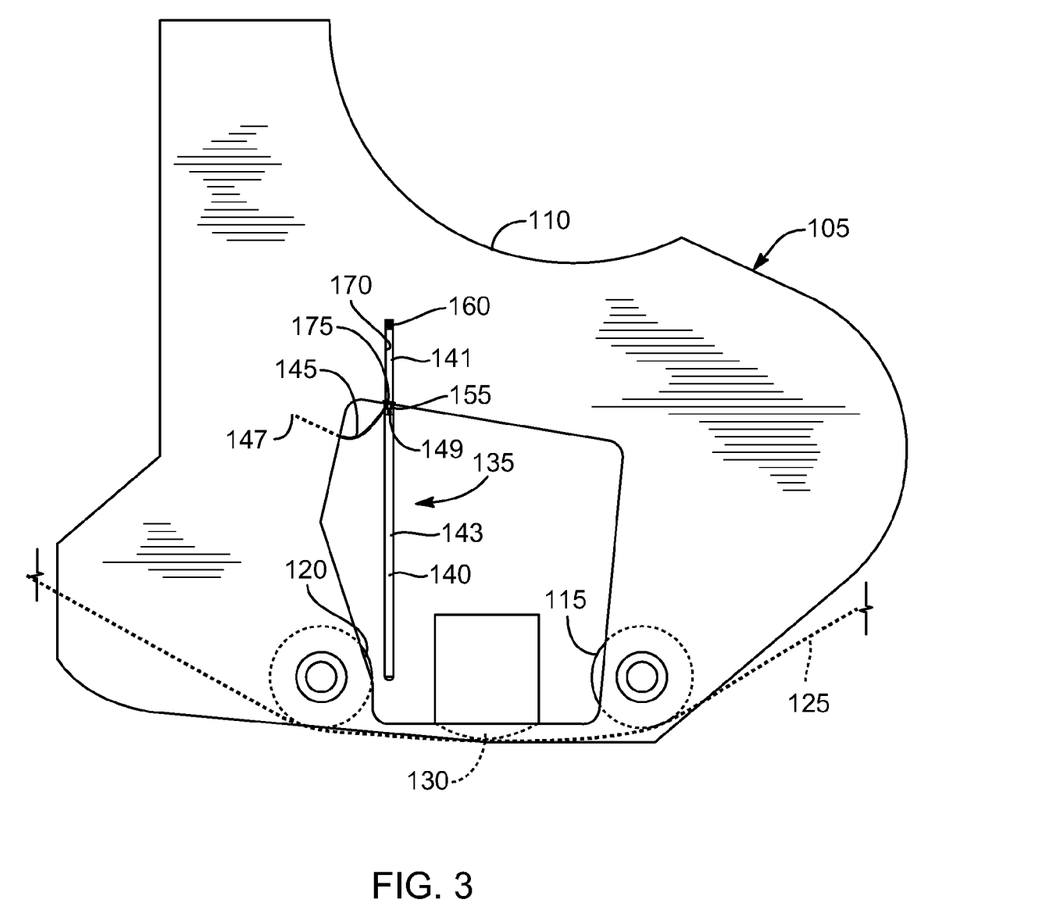
FIG. 3 is a top plan view of the magnetic head assembly of FIG. 2 with a tape lift mechanism in a retracted position
Figure 4:
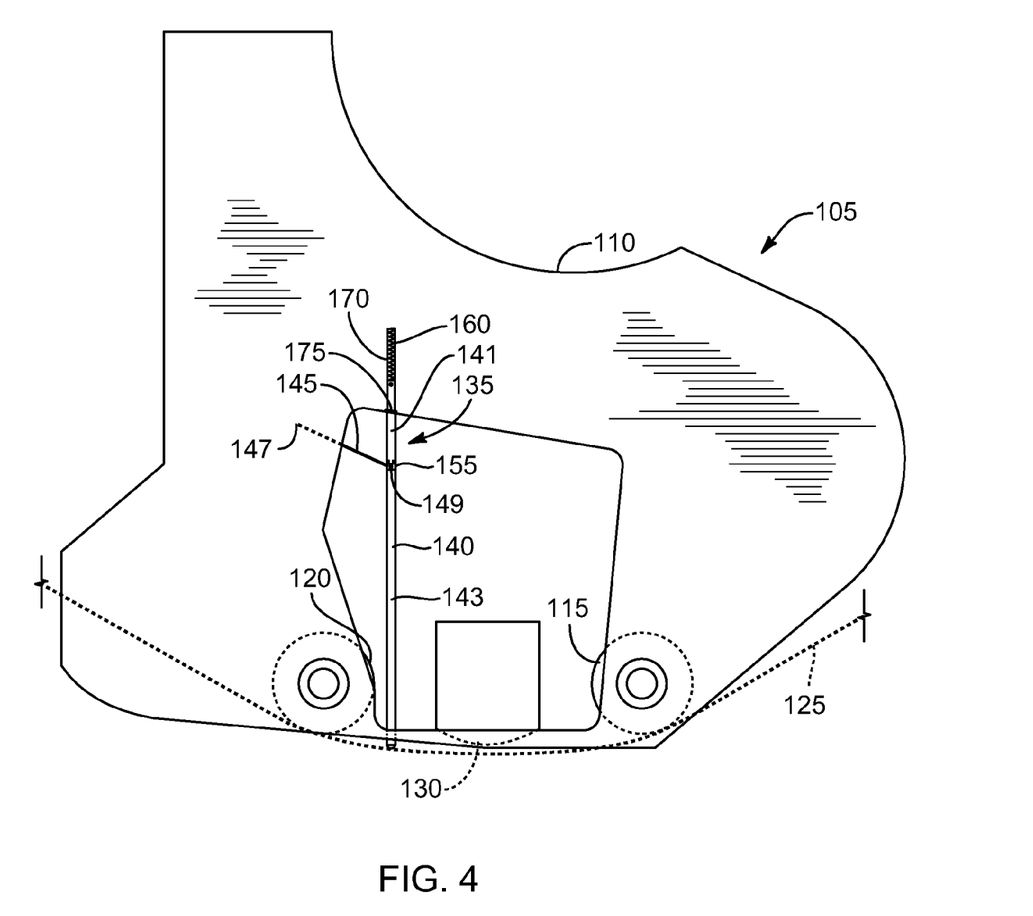
FIG. 4 is a top plan view of the magnetic head assembly of FIG. 2 with the tape lift mechanism in a deployed position.

The original or non-deformed shape of the actuator 145 is shown in FIG. 3. More specifically, the original shape of the actuator 145 is generally curved, such as having a "U" shape. Moreover, the actuator 145 is oriented such that the convex portion of the actuator 145 faces a forwardly direction, e.g., towards the magnetic head 130. When actuated, i.e., upon receiving an electric current, the actuator 145 reversibly deforms from the generally "U" shape into a deformed shape, e.g., a substantially straight shape as shown in FIGS. 2 and 4. Because the first fixed end 147 is fixed to the base 105, deformation of the actuator 145 into a straight shape causes the second movable end 149 to move forwardly. Moreover, because the second movable end 149 is attached to the lever 140, forward motion of the second movable end 149 translates into forward motion of the lever and tape engager 150 from a retracted position (see FIG. 3) to a deployed position (see FIGS. 2 and 4).

As shown in FIG. 3, the tape engager 150 is spaced apart from the tape 125 when in the retracted position. As the tape engager 150 moves forwardly from retracted position toward the deployed position, at some position intermediate the retracted and deployed position, the engager 150 contacts the tape 125. Further movement of the tape engager 150 toward the deployed position after contact with the tape 125 begins to incrementally move, e.g., lift, the tape in a direction substantially perpendicular to the plane of the tape and the direction of the tape when moving. Such lifting of the tape 125 causes tape in contact with the magnetic head 130 to lift and separate away from the magnetic head 130. The tape lift mechanism 135 continues to lift the tape 125 until the tape 125 is completely spaced-apart from or out-of-contact with the head upon reaching the deployed position as shown in FIG. 4. In this manner, tape 125 stuck to the magnetic head 130 as a result of stiction is unstuck from the head and the magnetic tape device 100 can begin or resume normal read/record/erase operations without fear of damaging the tape.

In some embodiments, the tape lift mechanism 135 includes a spring, such as an extension spring 160, coupled to the base at one end and the lever 140 at the opposite end. The extension spring 160 is configured to bias the lever 140 into the retracted position. Therefore, to move the lever 140 into the deployed position, the biasing force of the extension spring 160 must be overcome by the actuator 145.

Additionally, as shown in FIGS. 2-4, the base 105 can include a recessed portion 170 for receiving, aligning, and at least partially supporting the lever 140. The recessed portion 170 can be a substantially straight and elongate recess extending in a direction substantially perpendicular to the plane of the tape 125. As the actuator 145 actuates the lever 140, the recessed portion 170 acts to maintain a substantially linear movement of the lever in a direction substantially perpendicular to the plane of the tape 125. The lever 140 can be movably secured within the recessed portion 170 by one or more brackets 175 extending over a top of the recessed portion. In other embodiments, the lever 140 can be movably secured within the recessed portion 170 using any of various techniques, such as boring the recessed portion into the base 105.

The lever 140 can have any of various desirable shapes to properly position the tape engager 150 to contact and lift the tape 125. Preferably, the lever 140 is configured such that the engager 150 contacts the tape at a location intermediate a respective one of the guides 115, 120 and the magnetic head 130. For example, as shown in FIGS. 2 and 3, the tape engager 150 contacts the tape 125 at a location between the guide 120 and magnetic head 130. Although lifting the tape 125 at a location intermediate the guides 115, 120 and the magnetic head 130 may be preferred, in some embodiments, the tape lift mechanism 135 can be configured to extend just adjacent or through the magnetic head 130 for lifting the tape at a location in approximate contact with the head. Regardless of the desired location on the tape 125 for lifting the tape, the lever 140 should be shaped to place the engager 150 in contact with the desired location. For example, in one embodiment, a substantially straight lever is sufficient. However, in some embodiments, the shape of the lever 140 may be limited to the particular structure or configuration of the magnetic tape drive or magnetic head assembly. For example, in the illustrated embodiment shown in FIG. 2, the lever 140 has a stepped shape because the base 105 is somewhat elevated with respect to the tape 125. In other words, the supported end portion 141 and free end portion 143 extend parallel to each other but are spaced apart via an intermediate step portion 144.

Figure 5:
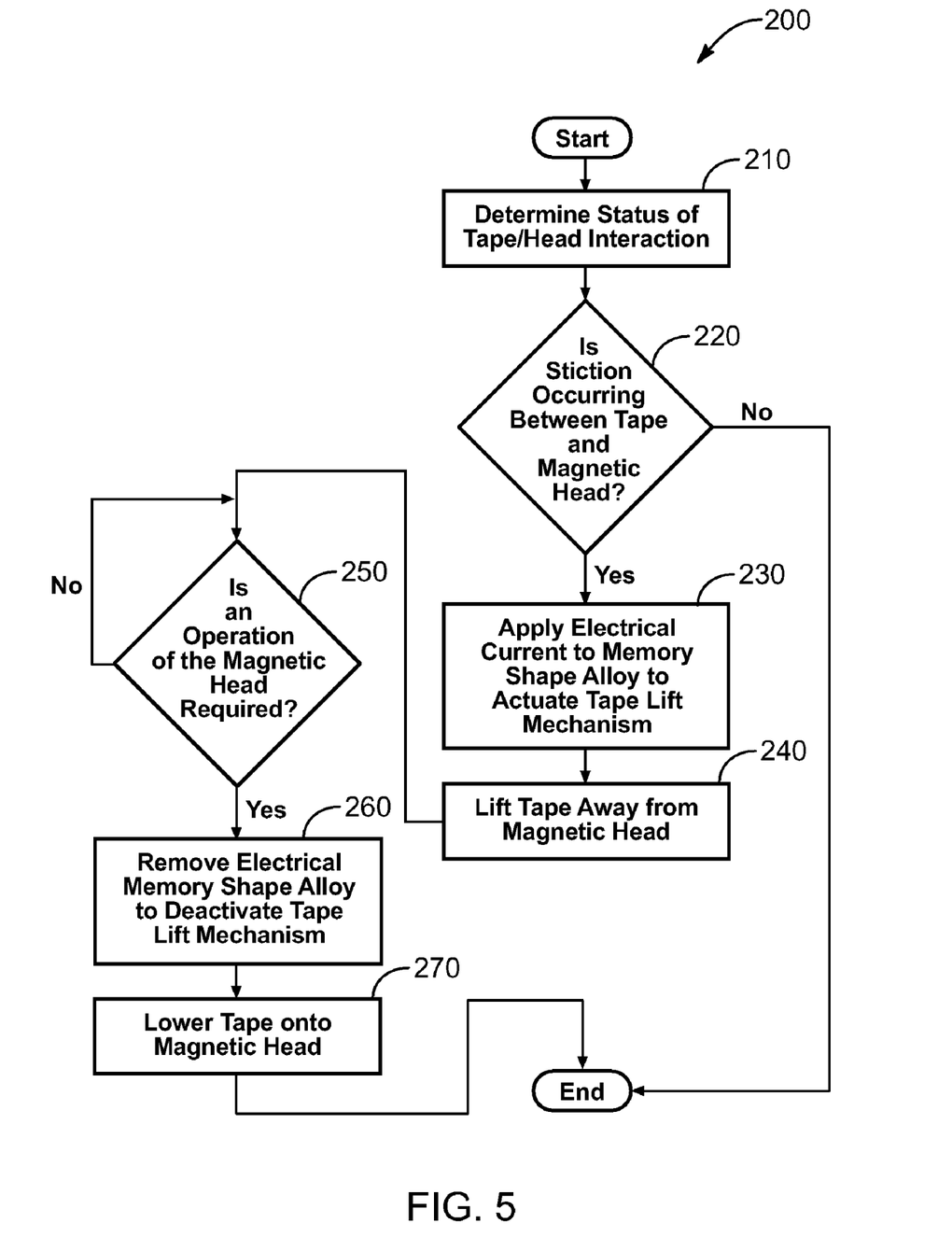
FIG. 5 is a schematic flow diagram illustrated one method for overcoming stiction on a magnetic tape device according to one representative embodiment.

In operation of the magnetic head assembly, and according to one method of use shown in FIG. 5, the controller 103 determines 210 the status of interaction between the tape 125 and the head 130. In other words, the controller 103 determines whether the tape is moving or stopped relative to the magnetic head 130. Basically, if the supply motor 111 and take-up motor 113 are rotating the reels 112, 114, then the tape 125 is moving. Otherwise, the tape 125 is stopped.

Once a determination of the tape-head interaction is made at 210, the method 200 proceeds to determine 220 whether stiction is occurring between the tape 125 and magnetic head 130. If the controller 103 determines that the tape 125 is moving at 210, then it is assumed that stiction between the tape 125 and head 130 is not occurring. If, however, the controller 103 determines that the tape 125 is not moving at 210, then the controller determines whether stiction is occurring according to any of various methods known in the art. For example, if the take-up motor 113 rotates the take-up reel 114 to wind tape from the supply reel 112, but the supply reel 112 does not correspondingly rotate, then it is determined at 220 that stiction is occurring.

If the tape 125 is moving or the controller determines that stiction is not occurring, then the method 200 ends. Alternatively, if the controller 103 determines that stiction between the tape 125 and head 130 is occurring, then the method 200 proceeds to event 230 where an electric current is applied to a memory shape alloy, e.g., actuator 145 made of a memory shape alloy, to actuate the tape lift mechanism 135. Application of the electric current at 230 causes the memory shape allow to deform from a first shape to a second shape (e.g., from a curved or bowed shape to a straight shape), and the tape lift mechanism 135 to lift 240 the tape 125 away from the magnetic head 130. The removal of the tape 125 from the head 130 effectively eliminates stiction between the tape and head.

In one implementation, the tape lift mechanism 135 remains in the deployed position until a read, write, erase operation is requested. In other words, in such an implementation, the method 200 determines 250 whether a magnetic head operation is requested. If a magnetic head operation is not requested, then the tape 135 remains out-of-contact with the head 130. If, however, a magnetic head operation is requested, then the electric current is removed 260 from the memory shape allowing the actuator 145 to deactivate or retract the tape lift mechanism 135. Deactivating the tape lift mechanism 135 results in the tape 125 being lowered 270 back onto the magnetic head 130 so that the magnetic tape device 100 can proceed with the requested magnetic head operation. Once the tape 125 is lowered 270 back into contact with the magnetic head 130, then the method ends. In an alternative implementation, the method 200 can skip event 250 and proceed directly to events 260 and 270 by automatically lowering the tape back onto the magnetic head 130 regardless of whether a magnetic head operation has been requested.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A magnetic head assembly for reducing stiction, comprising:
   a magnetic head communicable in data exchange communication with tape in contact with the magnetic head;
   a tape lifter movable relative to the magnetic head between a first position away from the tape and a second position in contact with the tape, wherein when the tape lifter is in the first position, tape is contactable with the magnetic head and when the tape lifter is in the second position, tape is not contactable with the magnetic head; and
   an actuator made at least partially of a memory shape alloy and coupled to the tape lifter, the memory shape alloy being resiliently deformable to move the tape lifter between the first and second positions.

2. The magnetic head assembly of claim 1, wherein as the tape lifter moves from the first position to the second position, the tape lifter lifts tape in contact with the magnetic head out-of-contact with the magnetic head.

3. The magnetic head assembly of claim 2, wherein the tape is lifted in a direction perpendicular to a major surface of the tape.

4. The magnetic head assembly of claim 1, wherein actuator is coupled to an electrical power source, and wherein the memory shape alloy is resiliently deformable to move the tape lifter from the first position to the second position by applying an electric current to the actuator from the electrical power source.

5. The magnetic head assembly of claim 1, wherein the actuator is selectively controllable to move the tape lifter from the first position to the second position when the tape is stationary relative to the magnetic head and stiction is detected between the tape and magnetic head.

6. The magnetic head assembly of claim 1, further comprising a biasing member coupled to the tape lifter and configured to bias the tape lifter in the first position.

7. The magnetic head assembly of claim 1, wherein the tape lifter comprises a lever having a tape engager portion, the tape engager portion comprising a tape contact surface substantially parallel to a major surface of the tape prior to and during contact with the tape.

8. The magnetic head assembly of claim 1, wherein the tape lifter comprises a lever having a tape engager portion, and wherein the lever and tape engager portion linearly move in a direction perpendicular to a plane of the tape as the tape lifter is actuated between the first and second positions.

9. The magnetic head assembly of claim 1, wherein when the tape lifter is in the first position, the actuator is substantially curved, and when the tape lifter is in the second position, the actuator is substantially straight.

10. A method for reducing stiction between a magnetic head of a magnetic tape device and tape in contact with the magnetic head, the method comprising:
    determining whether stiction is occurring between the magnetic head and stationary tape in contact with the head;
    if stiction is occurring between the magnetic head and stationary tape in contact with the head, reversibly deforming an actuator from a first shape to a second shape;
    moving a lever from a retracted position corresponding to the first shape of the actuator to a deployed position corresponding to the second shape of the actuator; and
    lifting the stationary tape in contact with the magnetic head away from the magnetic head with the lever as the lever moves from the retracted position to the deployed position.

11. The method of claim 10, wherein the actuator is made from a memory shape alloy and reversibly deforming the actuator comprises applying an electric current to the actuator.

12. The method of claim 10, wherein moving the lever from the retracted position to the deployed position comprises moving the lever along a substantially straight path in a direction substantially perpendicular to a plane of the tape.

13. The method of claim 10, further comprising lowering the stationary tape back into contact with the magnetic head by removing the electric current from the actuator if operation of the magnetic head is requested.

14. The method of claim 10, wherein the first shape comprises a substantially curved shape and the second shape comprises a substantially straight shape.

15. A magnetic tape device, comprising:
    a tape take-up reel communicable in tape receiving communication with a tape supply reel;
    a magnetic head assembly intermediate the tape take-up reel and supply reel and comprising a magnetic head contactable with tape extending between the tape take-up reel and supply reel, the magnetic head assembly further comprising a deployable lever coupled to a resiliently deformable actuator; and a controller operable to request application of an electric current to the actuator to deform the actuator;

wherein deformation of the actuator deploys the lever into contact with tape extending between the tape take-up reel and supply reel to lift tape in contact with the magnetic head away from the magnetic head.

16. The magnetic tape device of claim 15, wherein the controller requests application of an electric current to the actuator when tape extending between the tape take-up reel and supply reel is stationary relative to the magnetic head and stiction is occurring between the tape and the magnetic head.

17. The magnetic tape device of claim 15, wherein the actuator comprises an elongate member made from a memory shape alloy, the elongate member being curved before deformation and straight after deformation.

18. The magnetic tape device of claim 17, wherein the elongate member comprises a first end fixed relative to the magnetic head and a second end movable relative to the magnetic head, the second end being attached to the lever, wherein as the elongate member deforms, the free end moves about the fixed end to deploy the lever.

19. The magnetic tape device of claim 17, wherein the memory shape alloy comprises a nickel-titanium alloy.

20. The magnetic tape device of claim 15, wherein the controller is operable to remove the electric current from the actuator to allow the actuator to return to an undeformed state and retract the lever out of contact with tape extending between the tape take-up reel and supply reel to lower the tape back into contact with the magnetic head.

* * * * *